J. ALLEN.
Hand-Truck.
No. 221,713.  Patented Nov. 18, 1879.
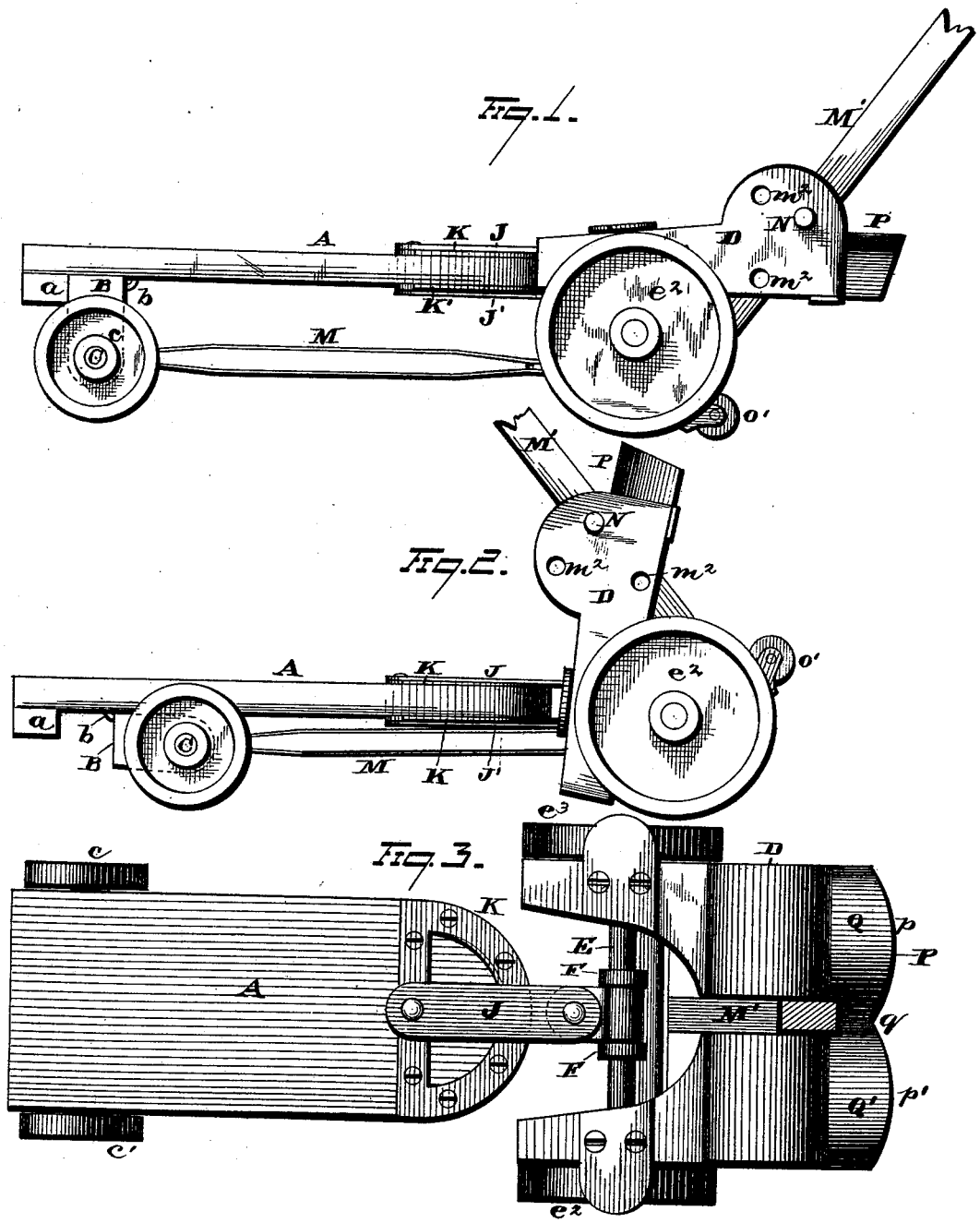
WITNESSES
INVENTOR
Joseph Allen
ATTORNEY

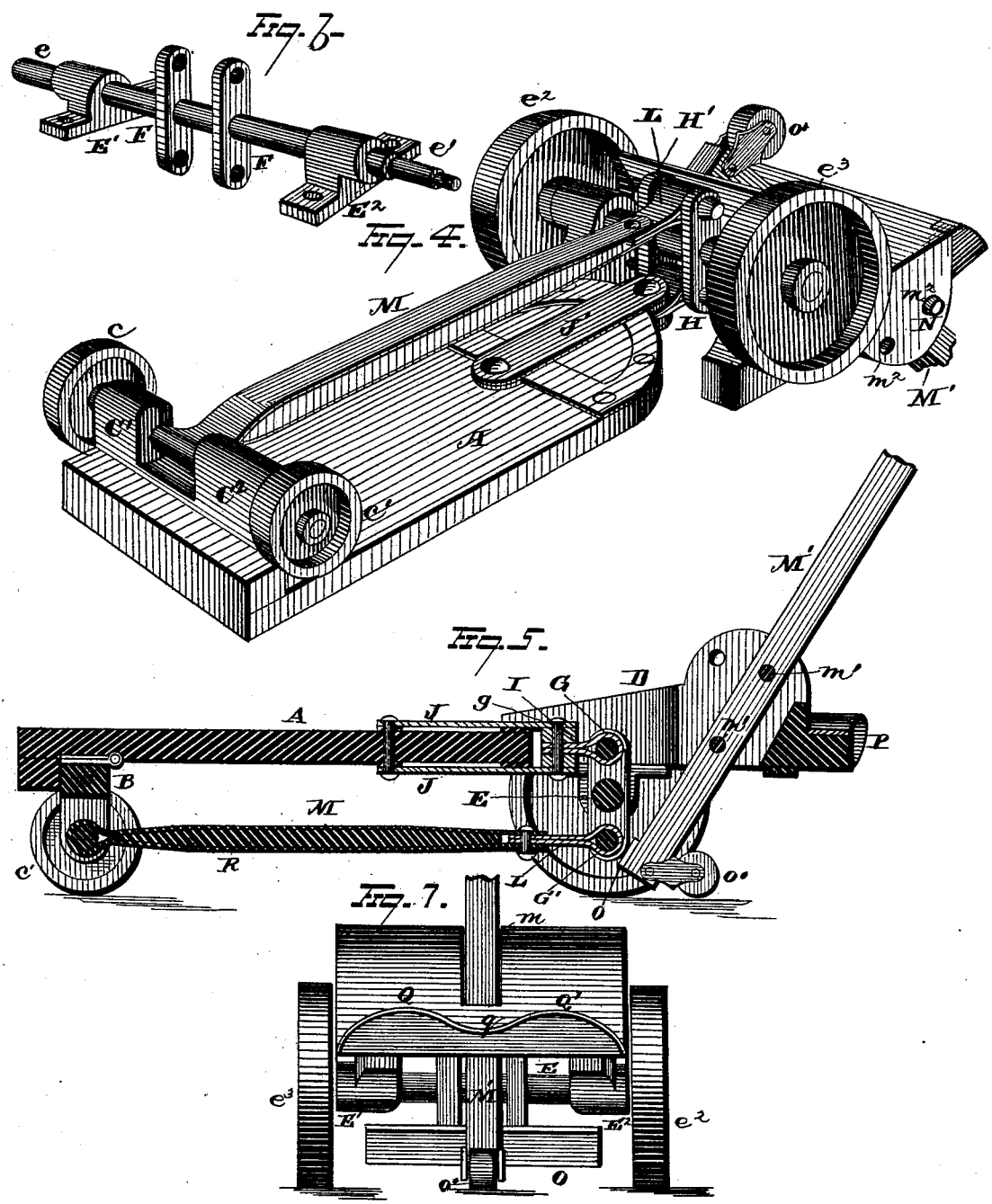
J. ALLEN.
Hand-Truck.
No. 221,713. Patented Nov. 18, 1879.

UNITED STATES PATENT OFFICE.

JOSEPH ALLEN, OF PALMYRA, NEW YORK.

IMPROVEMENT IN HAND-TRUCKS.

Specification forming part of Letters Patent No. 221,713, dated November 18, 1879; application filed September 30, 1879.

*To all whom it may concern:*

Be it known that I, JOSEPH ALLEN, of Palmyra, in the county of Wayne and State of New York, have invented certain new and useful Improvements in Hand-Trucks; and I do hereby declare the following to be a full, clear, and exact description of the invention, such as will enable others skilled in the art to which it pertains to make and use it, reference being had to the accompanying drawings, which form part of this specification.

My invention relates to an improvement in hand-trucks, the object being to provide a hand-truck of such construction that the body or platform of the truck may be raised and lowered to allow of the ready loading and unloading of stoves, boxes, or other bulky and heavy articles; and a further object of the invention is to construct the forward end of the truck in such a manner that it may be used as a bag-truck, to transport filled bags, by engaging with the sides of the bag.

To these ends my invention consists in the several details of construction and combinations of parts, as will hereinafter be described, and pointed out in the claims.

In the accompanying drawings, Figure 1 is a side elevation of my improved truck, showing the truck-platform in its elevated position. Fig. 2 is a similar view, showing the platform when lowered and in position for loading. Fig. 3 is a plan view of the truck. Fig. 4 is a view in perspective of the under side of the truck. Fig. 5 is a vertical longitudinal central section. Fig. 6 is a detached view of the forward axle and supporting-brackets. Fig. 7 is a front view of the truck.

A represents the platform of a truck, the rear end of which is preferably provided with a transverse cleat, $a$, secured to its under side. B is a hinged or pivoted truck-bolster, the upper end of the same being hinged at $b$ to the lower side of platform A, while the rear axle, C, of the truck is supported in bearings $C'$ $C^2$, which latter may be formed in single piece with bolster B, or may be made of separate castings, and secured to the bolster in any desired manner. The rear axle, C, is preferably fixed in its bearings so as not to revolve therein, and the rear supporting-wheels, $c$ $c'$, attached to the axle-spindles on opposite sides of the truck. D represents the forward frame of the truck, and to its under side is secured the axle E by means of the supporting-brackets $E'$ $E^2$.

In order to insure great strength and durability of parts, the axle E is made of wrought-iron or of steel, and provided with spindles $e$ $e'$ in its opposite ends, upon which are journaled the forward truck-wheels, $e^2$ $e^3$.

The central portion of axle E is provided with arms F F, the opposite ends of which are connected by detachable bolts or rods G G', for a purpose hereinafter described.

As considerable twisting strain is brought to bear on the axle E, it is desirable that it shall be so constructed and connected with its frame as to effectually resist any tendency to twist it out of its proper form and position; and to provide for this I cast the supporting-bearings $E'$ $E^2$ solid upon the axle E, and thus secure a perfectly rigid and durable structure.

The arms F F, connected with the forward axle, form two yokes, H H', located, respectively, above and below the axle. To the bolt or rod G, inserted in the arms of the upper yoke, H, is connected a strap, I, the rear ends of which are pivoted at $g$ to the forward ends of the links J J', which latter are pivoted at their rear ends to the upper and lower sides of the forward end of the platform A. The forward end of platform A is formed semicylindrical or of arc shape, and preferably provided with the bearings K K', which will receive the wear of the links J J'.

To the bolt or rod G' in the lower yoke, H', is attached a strap, L, the rear ends of which are pivoted to the forward end of the reach M. The rear end of the reach is connected with the rear axle.

The forward frame, D, is formed with a slot, $m$, for the insertion of the rear end of handle M', which latter may be provided with a series of holes, $m'$, to secure any desired adjustment as regards the length of handle. Truck-frame D is also provided with any desired number of holes $m^2$, within which may be placed the rod N, which passes through the lower end of the handle, and thus secures the latter at any desired angle of inclination.

The lower end of handle M' is provided with a transverse brace or support, O, for supporting the handle in an upright position when desired. To the lower end of the handle is also secured a bracket carrying a roller, $o'$, the latter serving to support the extreme forward end of the frame D when it is used for some purposes.

The forward end of frame D is provided with a nose, P, which projects outwardly from the frame. The outer edge of nose P is formed of the two converging edges $p\ p'$, which cause the bag to wedge itself in intimate contact with the nose-piece when the latter is forced against the side of a filled bag. The upper surface of nose P is also made up of two intersecting arcs, Q Q', thereby forming a central pocket, $q$, having gradually-sloping curved sides.

Having fully described the construction of the several parts of my improved truck, I will now describe its operation: When it is desired to load a stove or other heavy article upon the truck, the latter is backed up to the stove or other object. The handle of the truck is then thrown over backward. This causes the lower yoke to be moved forward of the center of the forward axle, and the upper yoke to be moved rearwardly of the same. As the upper yoke is connected with the platform A, and the lower yoke connected with the reach of the truck, the result is that the platform and reach are moved in opposite directions, a forward movement being imparted to the reach, and a rearward movement being imparted to the platform A of the truck. This movement of the platform and reach causes the hinged bolster to turn on its hinge from a vertical to a horizontal position, and its front side to rest against and support the lower side of the platform, and thus allow the platform to descend until it is in close proximity with the floor. The stove can then be readily loaded onto the truck, and by turning the handle forward again the platform is moved forward and the reach and rear axle moved rearward, thus causing the rear hinged bolster to be turned from a horizontal to a vertical position and elevating the platform and its load to the desired height for transportation.

The forward end of platform A is made circular in form, as heretofore described, and the reach and platform swiveled to the yokes of the forward axle, in order that the truck may be drawn or pushed within narrow and tortuous passages.

It will be observed that this is a valuable and important feature of my improvement, as the rear end of the truck may be pushed into a space where it would be otherwise impossible if the forward and rear sections were not swiveled, and when in such cramped position the platform of the truck may be readily lowered and any heavy article placed on the truck. Also, this feature of construction is often of great service in the unloading of a heavy article, as the truck may be backed up to the exact spot where it is desired to deposit the article.

The cleat on the rear end of the platform serves as a stop-brace for the rear side of the hinged bolster.

The handle of the truck may be secured at any desired angle of inclination, it being raised to nearly a vertical position when the truck is used for carrying bags.

The nose of the truck enables a bag to be raised and transported with little labor and trouble. As the converging edges of the nose are forced against the side of a bag the latter will wedge itself within said converging edges, and as the handle is thrown backward to lift the bag the contents thereof will settle into the pocket formed on the upper surface of the nose.

The brace on the lower end of the handle serves to hold the latter in an upright position when it is desired to attach any suitable hopper to the handle, and thus use the truck for filling bags.

The forward wheels of the truck are larger than the rear wheels, to enable the truck to be handled with the greatest ease possible.

The rear wheels are made comparatively small, in order that the platform may be lowered close to the floor.

The reach is light and durable in its construction, as it is made tapering at its opposite ends and of greatest thickness at its central portion. The reach is bound by a metal strap, R, which surrounds the rear axle, and its ends are pivoted to the strap connecting with the lower yoke of the forward axle. This construction of reach insures the desired lightness of material, and enables the reach to withstand the end-thrust to which it is subjected without liability of bending.

I do not limit myself to the employment of any especial material in the construction of my improved truck. The platform may be made of wood, or of light open-work, or cast-iron, according to the character of the work to be performed. The forward frame may be made of wood, or it may be cast in a single piece, and the bag-lifting nose formed integrally therewith in casting.

It is evident that many slight changes in construction and arrangement of parts may be devised without departing from the spirit of my invention, and hence I would have it understood that I do not limit myself to the exact construction and arrangement of parts shown and described; but, Having fully described my invention, what I claim as new, and desire to secure by Letters Patent, is—

1. The combination, with the rear carrying-wheels of a truck, of a platform hinged to a bolster supported on the rear axle, and a reach attached to the rear axle, said platform and reach being swiveled at their forward ends to yokes connected with and extending above and below the forward axle, substantially as set forth.

2. The combination, with the front and rear axles connected by a swiveled reach, of a truck-platform supported at its rear end upon a hinged bolster, said platform provided with a cleat extending transversely across its rear end, to serve as a bracing-stop for the hinged bolster, substantially as set forth.

3. In a hand-truck, the combination, with the forward axle, of a truck-platform supported upon a hinged bolster at its rear end, and connected by a swiveled joint with a yoke extending above the front axle, and a reach, the rear end of which is connected with the rear axle, and its forward end connected by a swivel-joint with a yoke extending below the front axle, substantially as set forth.

4. In a hand-truck, the combination, with the forward frame and forward axle rigidly secured thereto, of the platform, rear hinged bolster, rear axle, swiveled reach, and swiveled joint connecting the platform with the forward axle, substantially as set forth.

5. In a hand-truck, the combination, with the platform, hinged bolster, and rear axle, of a reach formed of wood, tapering from its center to its opposite ends, and a metal strap encircling the reach lengthwise, substantially as set forth.

6. In a hand-truck, the forward axle provided with yokes located on opposite sides of the axle, in combination with the platform and reach of the truck, substantially as set forth.

7. In a hand-truck, the forward axle made of wrought iron or steel, and having the supporting-brackets cast solid thereon, substantially as set forth.

8. A hand-truck provided with the bag-lifting nose, having curved converging forward edge and curved converging upper surface, substantially as set forth.

9. In a hand-truck, the combination, with the forward axle provided with a yoke, of the vertically-adjustable platform, a strap connected with the yoke, and links pivoted at their forward ends to said strap and at their rear ends to the upper and lower sides of said platform, substantially as set forth.

10. In a hand-truck, the combination, with the forward frame, of an adjustable handle having a cross brace or support attached to its lower or rear end, substantially as set forth.

11. In a hand-truck, the combination, with the forward frame, of an adjustable handle having a roller secured to its lower or rear end, substantially as set forth.

In testimony that I claim the foregoing I have hereunto set my hand.

JOSEPH ALLEN.

Witnesses:
  C. Z. CULVER,
  B. C. TIFFANY.